US010990527B2

(12) United States Patent
Wang et al.

(10) Patent No.: US 10,990,527 B2
(45) Date of Patent: Apr. 27, 2021

(54) STORAGE ARRAY WITH N-WAY ACTIVE-ACTIVE BACKEND

(71) Applicant: EMC IP HOLDING COMPANY LLC, Hopkinton, MA (US)

(72) Inventors: Jiahui Wang, Framingham, MA (US); Peng Yin, Southborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 90 days.

(21) Appl. No.: 16/569,704

(22) Filed: Sep. 13, 2019

(65) Prior Publication Data
US 2021/0081319 A1  Mar. 18, 2021

(51) Int. Cl.
G06F 12/00 (2006.01)
G06F 12/0804 (2016.01)
G06F 13/40 (2006.01)
G06F 13/00 (2006.01)
G06F 3/06 (2006.01)

(52) U.S. Cl.
CPC ........ G06F 12/0804 (2013.01); G06F 3/0604 (2013.01); G06F 3/067 (2013.01); G06F 3/0634 (2013.01); G06F 3/0635 (2013.01); G06F 3/0656 (2013.01); G06F 13/00 (2013.01); G06F 13/4027 (2013.01); G06F 2212/1032 (2013.01)

(58) Field of Classification Search
CPC .. G06F 12/0804; G06F 3/0604; G06F 3/0634; G06F 3/0635; G06F 3/067; G06F 13/00; G06F 13/4027; G06F 2212/1032
See application file for complete search history.

(56) References Cited

U.S. PATENT DOCUMENTS

| | | | | |
|---|---|---|---|---|
| 8,806,125 | B2* | 8/2014 | Zimoto | G06F 3/0665 711/114 |
| 9,916,247 | B2* | 3/2018 | Steinmacher-Burow | G06F 12/0817 |
| 10,852,954 | B1* | 12/2020 | Krasner | G06F 13/28 |
| 2005/0182888 | A1* | 8/2005 | Murotani | G06F 11/1451 711/1 |
| 2018/0095906 | A1* | 4/2018 | Doshi | G06F 13/1663 |
| 2020/0242031 | A1* | 7/2020 | Dalmatov | G06F 12/0868 |

* cited by examiner

Primary Examiner — John A Lane
(74) Attorney, Agent, or Firm — Anderson Gorecki LLP

(57) ABSTRACT

A SAN storage node has multiple engines, each including at least one computing node with at least one drive adapter for accessing arrays of drives. All drives of the SAN node are accessible by all drive adapters. The drives are organized into hypers. Each hyper is accessible to all drive adapters. Each drive is temporarily associated with a preferred owner for spin-up. A drive adapter that initializes spin-down of one of the drives takes a spindle lock on the drive being spun-down and prompts all other drive adapters to complete outstanding IOs on the drive being spun-down.

20 Claims, 4 Drawing Sheets

STORAGE ARRAY WITH N-WAY ACTIVE-ACTIVE BACKEND

TECHNICAL FIELD

The subject matter of this disclosure is generally related to data storage, and more particularly to SAN (storage area network) nodes such as storage arrays.

BACKGROUND

Data centers are used to maintain data associated with critical functions for which avoidance of data loss and maintenance of data availability are important. A key building block of a data center is the SAN. SANs provide host servers with block-level access to data used by applications that run on the host servers. One type of SAN node is a storage array. A storage array may include a network of compute nodes that manage access to arrays of disk drives. The storage array creates a logical storage device known as a production volume on which host application data is stored. The production volume has contiguous LBAs (logical block addresses). The host servers send block-level IO (input-output) commands to the storage array to access the production volume. The production volume is a logical construct, so the host application data is maintained at non-contiguous locations on the arrays of managed drives to which the production volume is mapped by the compute nodes. SANs have advantages over other types of storage systems in terms of potential storage capacity and scalability.

The compute nodes of a storage array include drive adapters for accessing the managed drives. In typical prior art implementations, there is an architectural ownership relationship between the drive adapters and the managed drives. For example, each managed drive might be exclusively owned by a single drive adapter based on hardwired connections. The owner drive adapter manages spin-up, spin-down and access to the owned drive. Dual access technology now exists so multiple drive adapters can access the same drive, but portions of managed drives are still exclusively owned by individual drive adapters.

SUMMARY

All examples, aspects and features mentioned in this document can be combined in any technically possible way.

In accordance with some aspects an apparatus comprises: a storage node comprising: a first engine comprising at least one computing node with at least one drive adapter; a second engine comprising at least one computing node with at least one drive adapter; at least one drive array comprising a plurality of drives; and an interconnecting fabric via which the drives of the drive array are accessible to the drive adapter of the first engine and the drive adapter of the second engine; wherein the drives of the drive array are organized into hypers and each hyper is accessible to both the drive adapter of the first engine and the drive adapter of the second engine. In some implementations ones of the drive adapters are designated as preferred owners for spinning-up the drives of the drive array such that each drive has only one preferred owner. In some implementations preferred ownership is designated on a round-robin basis. In some implementations preferred ownership is designated based on load balancing among the drive adapters of the storage node. In some implementations preferred ownership of drives owned by a failed drive adapter is redistributed. In some implementations one of the drive adapters initiates global draining to a selected drive by generating a global draining request. In some implementations the drive adapter that initiates the global draining request is designated as a master drive adapter for global draining. In some implementations the master drive adapter takes a spindle lock on the selected drive. In some implementations the master drive adapter sends a message to all other drive adapters to initiate global draining. In some implementations the master drive adapter sends a global draining completion message after all drive adapters have drained cached data to the selected drive.

In accordance with some aspects a method comprises: in a storage node comprising a first engine comprising at least one computing node with at least one drive adapter, a second engine comprising at least one computing node with at least one drive adapter, at least one drive array comprising a plurality of drives, and an interconnecting fabric via which the drives of the drive array are accessible to the drive adapter of the first engine and the drive adapter of the second engine: organizing the drives of the drive array into hypers; and causing each hyper to be accessible to both the drive adapter of the first engine and the drive adapter of the second engine. Some implementations comprise designating ones of the drive adapters as preferred owners for spinning-up the drives of the drive array such that each drive has only one preferred owner. Some implementations comprise designating preferred ownership on a round-robin basis. Some implementations comprise designating preferred ownership based on load balancing among the drive adapters of the storage node. Some implementations comprise redistributing preferred ownership of drives owned by a failed drive adapter. Some implementations comprise one of the drive adapters initiating global draining to a selected drive by generating a global draining request. Some implementations comprise designating the drive adapter that initiates the global draining request as a master drive adapter for global draining. Some implementations comprise the master drive adapter taking a spindle lock on the selected drive. Some implementations comprise the master drive adapter sending a message to all other drive adapters to initiate global draining.

In accordance with some aspects an apparatus comprises: a storage node comprising: a first engine comprising at least one computing node with at least one drive adapter; a second engine comprising at least one computing node with at least one drive adapter; at least one drive array comprising a plurality of drives; and an interconnecting fabric via which the drives of the drive array are accessible to the drive adapter of the first engine and the drive adapter of the second engine; wherein the drives of the drive array are organized into hypers and each hyper is accessible to both the drive adapter of the first engine and the drive adapter of the second engine; wherein each drive is temporarily associated with a preferred owner for spin-up; and wherein a drive adapter that initializes spin-down of one of the drives takes a spindle lock on the drive being spun-down and prompts all other drive adapters to drain dirty data from memory to the drive being spun-down.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
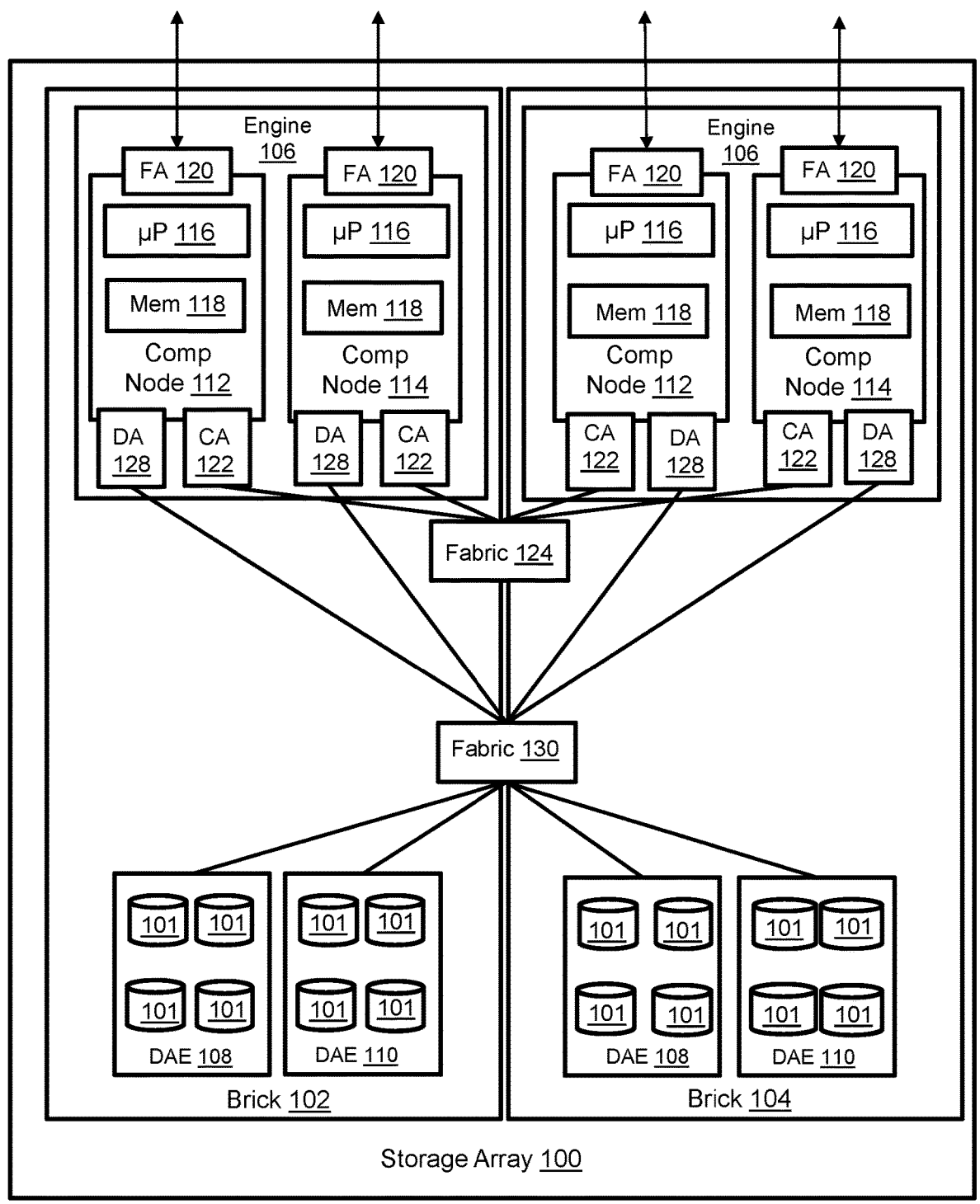
FIG. 1 illustrates a storage array with an N-way active-active backend.

FIG. 1 illustrates a storage array 100 with an N-way active-active backend. The storage array includes one or more bricks 102, 104. Each brick includes an engine 106 and one or more drive array enclosures (DAEs) 108, 110. Each DAE includes managed drives 101 of one or more technology types. Examples may include, without limitation, solid state drives (SSDs) such as flash and hard disk drives (HDDs) with spinning disk storage media. Each DAE might include 24 or more managed drives, but the figure is simplified for purposes of illustration. Each engine 106 includes a pair of interconnected computing nodes 112, 114, which are sometimes referred to as "storage directors." Each computing node includes at least one multi-core processor 116 and local memory 118. The processor may include CPUs, GPUs, or both. The local memory 125 may include volatile random-access memory (RAM) of any type, non-volatile memory (NVM) such as storage class memory (SCM), or both. Each computing node includes one or more front-end adapters (FAs) 120 for communicating with host servers and other external nodes. Each computing node also includes one or more drive adapters (DAs) 122 for communicating with the managed drives 101 in the DAEs 108, 110. Each computing node may also include one or more channel adapters (CAs) 122 for communicating with other computing nodes via an interconnecting fabric 124. Each computing node may allocate a portion or partition of its respective local memory 118 to a logical shared "global" memory that can be accessed by other computing nodes, e.g. via direct memory access (DMA) or remote direct memory access (RDMA). The paired computing nodes 112, 114 of each engine 106 provide failover protection and may be directly interconnected by communication links.

An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the storage array can access every managed drive 101 in the storage array. Still further, in some implementations every DA in the storage array can access every split/hyper of every managed drive in the storage array as will be explained in greater detail below.

Figure 2:
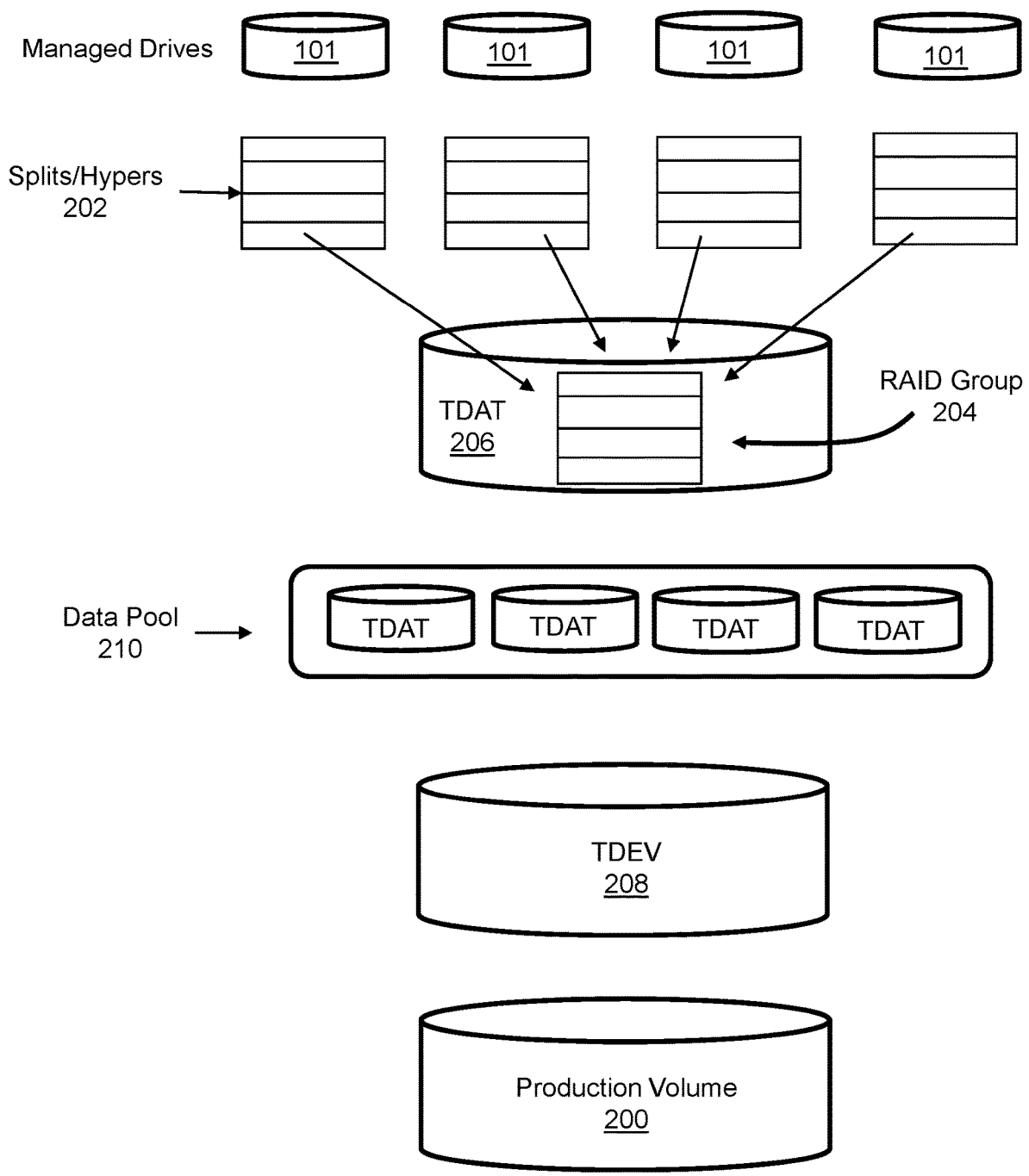
FIG. 2 illustrates the relationship between the managed drives and logical devices within the storage array of FIG. 1.

Referring to FIGS. 1 and 2, the managed drives 101 are not discoverable by host servers but the storage array 100 creates a logical production device 200 that can be discovered and accessed by the host servers. The production volume is used by host applications for storage of host application data. Without limitation, the production volume may be referred to as a production device or production LUN, where LUN (Logical Unit Number) is a number used to identify the logical storage volume in accordance with the SCSI (Small Computer System Interface) protocol. From the perspective of the host servers the production volume 200 is a single data storage device having a set of contiguous fixed-size logical block addresses (LBAs) on which data used by instances of the host application resides. However, the host application data is stored at non-contiguous addresses on various managed drives 101.

To service IOs from instances of a host application the storage array 100 maintains metadata that indicates, among various things, mappings between LBAs of the production volume 200 and addresses with which extents of host application data can be accessed from the shared memory and managed drives 101. In response to a data access instruction from an instance of the host application to read data from the production volume the storage array uses the metadata to find the requested data in the shared memory or managed drives. More particularly, if the requested data is not in the shared memory then the requested data is temporarily copied into the shared memory from the managed drives and used to service the TO, i.e. reply to the host application with the data via one of the computing nodes. In the case of an IO to write data to the production volume the storage array copies the data into shared memory, marks the corresponding production volume location as dirty in the metadata, and creates new metadata that maps the production volume address with a location to which the data is eventually written on the managed drives.

Multiple layers of abstraction are created between the managed drives 101 and the production volume 200. Each managed drive 101 is organized into a plurality of splits (aka hypers) 202. Each hyper is a contiguously addressed portion of the managed drive. The hypers may all have the same fixed size. RAID groups are created with member hypers from different managed drives, e.g. hypers from four different managed drives in a RAID-5 (3+1) group 204. RAID groups formed in that way may be used to create a data device (TDAT) 206. Multiple TDATs provide physical storage to be used by thin devices (TDEVs) such as TDEV 208. In some implementations, all TDATs in a drive group are of a single RAID protection type and all are the same size. Because of this, each drive in the group has the same number of hypers, with each hyper being the same size. A data pool 210, also known as a thin pool, is a collection of TDATs of the same emulation and RAID protection type. All data devices configured in a single disk group may be contained in a single data pool. As such, all the data devices are configured on drives of the same technology type, capacity, and, if applicable, rotational speed. TDEVs are created with data pool resources. The production volume 200 is created from TDEVs.

In an N-way active-active backend the accessibility of all managed drives and all hypers by all DAs creates potential contention situations. Contention for hypers may be resolved by using locks on hypers. For example, a DA may obtain a red, write, or read/write lock on a hyper. Although locks help to resolve contention, the absence of DA ownership also complicates drive initialization (spin-up) and de-initialization (spin-down).

Figure 3:
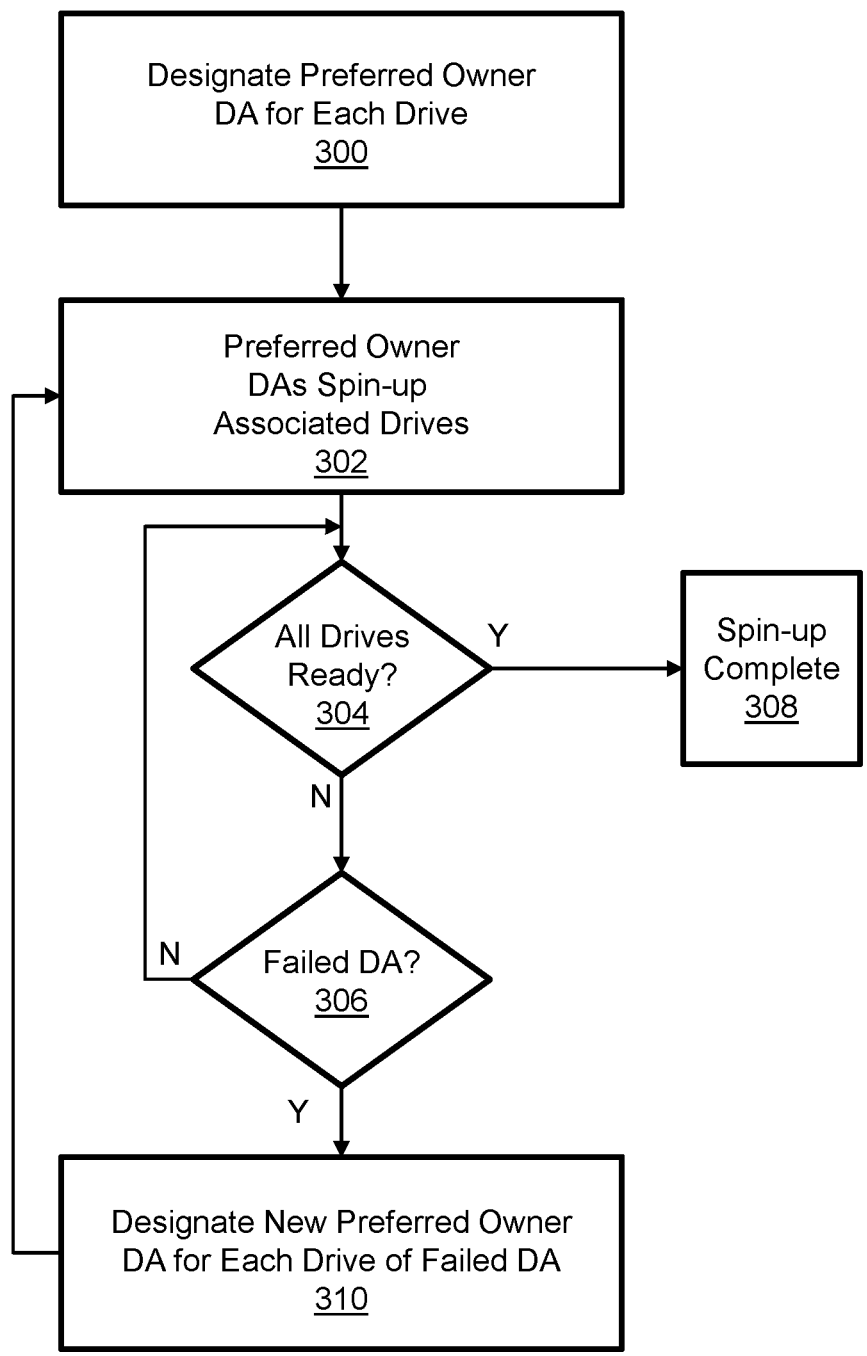
FIG. 3 illustrates drive spin-up in the storage array of FIG. 1.

FIG. 3 illustrates drive spin-up in the storage array of FIG. 1. Drive spin-up may occur when a drive is initialized, e.g. upon power-up, reboot, or moving a spare drive into service. Spin-up includes accelerating the platters of HDDs and the optical disks of optical drives from a stopped state to an operational speed. Further, associated logical device records must be provided to DAs in order to handle all TDAT devices associated with the drive. Step 300 is designating a preferred owner for each drive being spun-up. For example, and without limitation, preferred ownership of all managed drives or a subset of drives could be distributed among the DAs in the storage array on a random or round-robin basis. Any of a wide variety of load balancing and other distribution techniques could be used to designate a single DA as the preferred owner of each managed drive. Preferred ownership was previously unnecessary with architecturally-fixed ownership of managed drives by DAs. In step 302 the preferred owner DAs each spin-up their associated drives. As indicated in decision block 304 a determination is made as to whether all drives are ready. This may occur after some predetermined delay. If all drives are not ready, then a determination is made as to whether there is a failed DA as indicated in decision block 306. If no failed DA is found then flow returns to decision block 304, possibly after a predetermined delay. When all drives are determined to be ready then spin-up is complete as indicated in step 308 and notifications may be generated and sent. For example, each preferred owner DA may provide the gathered logical device records to the non-preferred owner DAs. If the presence of a failed DA is detected in block 306 then a new preferred owner DA is designated for each drive for which the failed DA had preferred ownership as indicated in step 310. The new preferred owner DAs spin-up the drives in step 302 and flow continues as shown until spin-up is complete.

Figure 4:
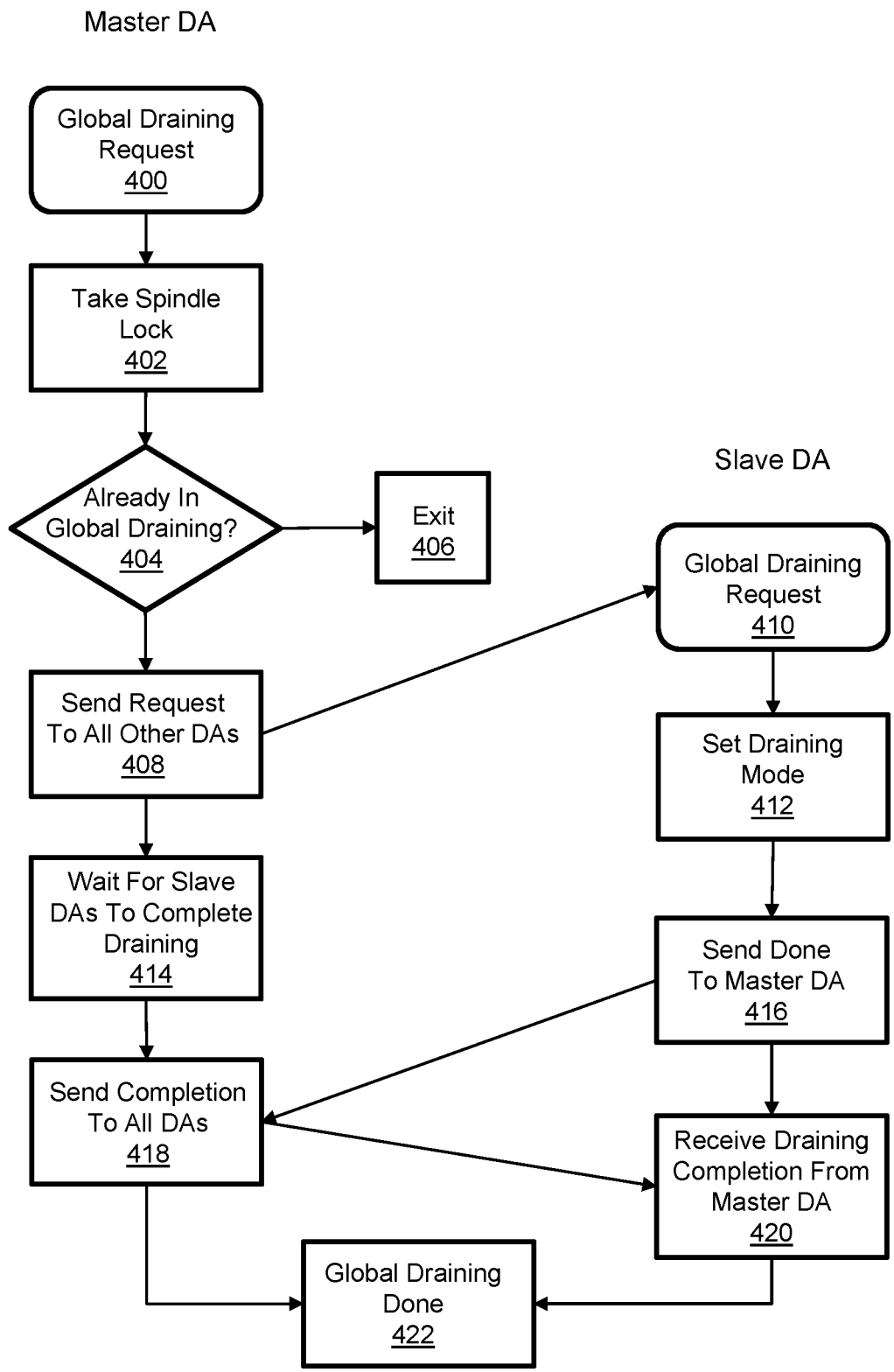
FIG. 4 illustrates global draining in the storage array of FIG. 1.

FIG. 4 illustrates global draining in the storage array of FIG. 1. Global draining may occur when a drive is spun-down. A drive may be spun down during reboot, shutdown, for power usage management, or when being taken out of service. Spin-down may include de-staging data from the shared memory to the managed drive and decelerating the platters of HDDs and the optical disks of optical drives from operational speed to a stopped state. Spin down commences with generation of a global draining request as indicated in step 400. The DA that generates the initial global draining request is designated as the master DA. All other DAs in the storage array are designated as slave DAs. As indicated in step 402 the master DA takes a spindle lock on the drive. If the storage array is already actively performing global draining as determined at decision block 404 then flow exits as indicated at step 406. If the storage array is not already actively performing global draining as determined at decision block 404 then the master DA sends a global draining request to the slave DAs as indicated in step 408. Following receipt of the global draining request from the master DA as shown in step 410 the slave DAs enter draining mode as indicated at step 412. In draining mode the slave DAs complete all outstanding IOs associated with the drive being spun-down. While the slave DAs are performing draining to the drive the master DA is waiting for the slave DAs to complete draining as indicated in step 414. The slave DAs send indications to the master DA that draining is complete as indicated in step 416. The master DA then sends a draining completion message to all DAs as indicated in step 418. After the slave DAs receive the draining completion message from the master DA as indicated in step 420 global draining is complete as indicated in step 422.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a storage node comprising:
    a first engine comprising at least one computing node with at least one drive adapter;
    a second engine comprising at least one computing node with at least one drive adapter;
    at least one drive array comprising a plurality of drives; and
    an interconnecting fabric via which the drives of the drive array are accessible to the drive adapter of the first engine and the drive adapter of the second engine;
    wherein the drives of the drive array are organized into hypers and each hyper is accessible to both the drive adapter of the first engine and the drive adapter of the second engine.

2. The apparatus of claim 1 wherein ones of the drive adapters are designated as preferred owners for spinning-up the drives of the drive array such that each drive has only one preferred owner.

3. The apparatus of claim 2 wherein preferred ownership is designated on a round-robin basis.

4. The apparatus of claim 2 wherein preferred ownership is designated based on load balancing among the drive adapters of the storage node.

5. The apparatus of claim 2 wherein preferred ownership of drives owned by a failed drive adapter is redistributed.

6. The apparatus of claim 1 wherein one of the drive adapters initiates global draining to a selected drive by generating a global draining request.

7. The apparatus of claim 6 wherein the drive adapter that initiates the global draining request is designated as a master drive adapter for global draining.

8. The apparatus of claim 7 wherein the master drive adapter takes a spindle lock on the selected drive.

9. The apparatus of claim 8 wherein the master drive adapter sends a message to all other drive adapters to initiate global draining.

10. The apparatus of claim 9 wherein the master drive adapter sends a global draining completion message after all drive adapters have drained cached data to the selected drive.

11. A method comprising:
in a storage node comprising a first engine comprising at least one computing node with at least one drive adapter, a second engine comprising at least one computing node with at least one drive adapter, at least one drive array comprising a plurality of drives, and an interconnecting fabric via which the drives of the drive array are accessible to the drive adapter of the first engine and the drive adapter of the second engine:
organizing the drives of the drive array into hypers; and
causing each hyper to be accessible to both the drive adapter of the first engine and the drive adapter of the second engine.

12. The method of claim 11 comprising designating ones of the drive adapters as preferred owners for spinning-up the drives of the drive array such that each drive has only one preferred owner.

13. The method of claim 11 comprising designating preferred ownership on a round-robin basis.

14. The method of claim 13 comprising designating preferred ownership based on load balancing among the drive adapters of the storage node.

15. The method of claim 13 comprising redistributing preferred ownership of drives owned by a failed drive adapter.

16. The method of claim 11 comprising one of the drive adapters initiating global draining to a selected drive by generating a global draining request.

17. The method of claim 16 comprising designating the drive adapter that initiates the global draining request as a master drive adapter for global draining.

18. The method of claim 17 comprising the master drive adapter taking a spindle lock on the selected drive.

19. The method of claim 18 comprising the master drive adapter sending a message to all other drive adapters to initiate global draining.

20. An apparatus, comprising:
a storage node comprising:
a first engine comprising at least one computing node with at least one drive adapter;
a second engine comprising at least one computing node with at least one drive adapter;
at least one drive array comprising a plurality of drives; and
an interconnecting fabric via which the drives of the drive array are accessible to the drive adapter of the first engine and the drive adapter of the second engine;
wherein the drives of the drive array are organized into hypers and each hyper is accessible to both the drive adapter of the first engine and the drive adapter of the second engine;
wherein each drive is temporarily associated with a preferred owner for spin-up; and
wherein a drive adapter that initializes spin-down of one of the drives takes a spindle lock on the drive being spun-down and prompts all other drive adapters to drain dirty data from memory to the drive being spun-down.

* * * * *